(12) United States Patent
DeWitt, Jr. et al.

(10) Patent No.: US 7,415,705 B2
(45) Date of Patent: Aug. 19, 2008

(54) AUTONOMIC METHOD AND APPARATUS FOR HARDWARE ASSIST FOR PATCHING CODE

(75) Inventors: Jimmie Earl DeWitt, Jr., Georgetown, TX (US); Frank Eliot Levine, Austin, TX (US); Christopher Michael Richardson, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 10/757,171

(22) Filed: Jan. 14, 2004

(65) Prior Publication Data

US 2005/0155030 A1  Jul. 14, 2005

(51) Int. Cl.
*G06F 9/44* (2006.01)
(52) U.S. Cl. .................. 717/168; 717/128; 717/169
(58) Field of Classification Search .......... 717/159, 717/168, 169, 128, 120, 125, 141; 713/1, 713/100, 190
See application file for complete search history.

(56) References Cited

U.S. PATENT DOCUMENTS

| 4,291,371 A | 9/1981 | Holtey ................. 364/200 |
| 4,316,245 A | 2/1982 | Luu et al. |
| 5,051,944 A | 9/1991 | Fetterolf et al. |
| 5,103,394 A | 4/1992 | Blasciak ............... 395/575 |
| 5,142,634 A | 8/1992 | Fite et al. |
| 5,212,794 A | 5/1993 | Pettis et al. ............ 395/700 |
| 5,339,426 A * | 8/1994 | Aoshima .................. 713/1 |
| 5,394,529 A | 2/1995 | Brown, III et al. |
| 5,544,342 A | 8/1996 | Dean |
| 5,581,778 A | 12/1996 | Chin et al. |
| 5,603,004 A | 2/1997 | Kurpanek et al. |
| 5,659,679 A | 8/1997 | Alpert et al. |
| 5,689,712 A | 11/1997 | Heisch ................. 395/704 |
| 5,691,920 A | 11/1997 | Levine et al. ......... 364/551.01 |

(Continued)

FOREIGN PATENT DOCUMENTS

JP  2000029731  12/1999

(Continued)

OTHER PUBLICATIONS

Kikuchi, "Parallelization Assist System", Joho Shori, vol. 34, No. 9, Sep. 1993, pp. 1158-1169.

(Continued)

*Primary Examiner*—Meng-Al T. An
*Assistant Examiner*—Mark P. Francis
(74) *Attorney, Agent, or Firm*—Duke W. Yee; Herman Rodriguez; Gerald H. Glanzman

(57) ABSTRACT

A method, apparatus and computer instructions for hardware assist for autonomically patching code. The present invention provides hardware microcode to a new type of metadata to selectively identify instructions to be patched for specific performance optimization functions. The present invention also provides a new flag in the machine status register (MSR) to enable or disable a performance monitoring application or process to perform code-patching functions. If the code patching function is enabled, the application or process may patch code at run time by associating the metadata with the selected instructions. The metadata includes pointers pointing to the patch code block code. The program code may be patched autonomically without modifying original code.

8 Claims, 4 Drawing Sheets

U.S. PATENT DOCUMENTS

| | | | |
|---|---|---|---|
| 5,708,803 A | 1/1998 | Ishimi et al. | |
| 5,752,062 A | 5/1998 | Gover et al. | |
| 5,768,500 A | 6/1998 | Agrawal et al. | |
| 5,774,724 A | 6/1998 | Heisch | 395/704 |
| 5,794,028 A | 8/1998 | Tran | |
| 5,875,334 A * | 2/1999 | Chow et al. | 717/141 |
| 5,920,721 A * | 7/1999 | Hunter et al. | 717/159 |
| 5,930,508 A | 7/1999 | Faraboschi et al. | 395/706 |
| 5,937,437 A | 8/1999 | Roth et al. | 711/202 |
| 5,938,766 A * | 8/1999 | Anderson et al. | 713/100 |
| 5,938,778 A | 8/1999 | John, Jr. et al. | 714/45 |
| 5,940,618 A | 8/1999 | Blandy et al. | |
| 5,950,003 A | 9/1999 | Kaneshiro et al. | |
| 5,950,009 A | 9/1999 | Bortnikov et al. | |
| 5,966,537 A | 10/1999 | Ravichandran | 395/709 |
| 5,966,538 A | 10/1999 | Granston et al. | |
| 5,970,439 A | 10/1999 | Levine et al. | |
| 5,987,250 A | 11/1999 | Subrahmanyam | 395/704 |
| 6,006,033 A | 12/1999 | Heisch | |
| 6,009,514 A | 12/1999 | Henzinger et al. | |
| 6,026,235 A | 2/2000 | Shaughnessy | |
| 6,070,009 A | 5/2000 | Dean et al. | 395/704 |
| 6,101,524 A | 8/2000 | Choi et al. | 709/102 |
| 6,119,075 A | 9/2000 | Dean et al. | |
| 6,134,676 A | 10/2000 | VanHuben et al. | 714/39 |
| 6,189,141 B1 | 2/2001 | Benitez et al. | 717/4 |
| 6,189,142 B1 | 2/2001 | Johnston et al. | |
| 6,192,513 B1 | 2/2001 | Subrahmanyam | 717/5 |
| 6,202,199 B1 * | 3/2001 | Wygodny et al. | 717/125 |
| 6,206,584 B1 | 3/2001 | Hastings | 395/183.11 |
| 6,223,338 B1 | 4/2001 | Smolders | 717/4 |
| 6,233,679 B1 | 5/2001 | Holmberg | |
| 6,237,141 B1 | 5/2001 | Holzle et al. | |
| 6,243,804 B1 | 6/2001 | Cheng | 712/228 |
| 6,256,771 B1 | 7/2001 | O'Neil et al. | |
| 6,256,775 B1 | 7/2001 | Flynn | 717/4 |
| 6,286,132 B1 | 9/2001 | Tanaka et al. | 717/4 |
| 6,324,689 B1 | 11/2001 | Lowney et al. | 717/9 |
| 6,330,662 B1 | 12/2001 | Patel et al. | 712/236 |
| 6,349,406 B1 | 2/2002 | Levine et al. | |
| 6,351,844 B1 | 2/2002 | Bala | 717/4 |
| 6,374,364 B1 | 4/2002 | McElroy et al. | 714/10 |
| 6,430,741 B1 | 8/2002 | Mattson, Jr. et al. | 717/154 |
| 6,442,585 B1 | 8/2002 | Dean et al. | 709/108 |
| 6,446,029 B1 | 9/2002 | Davidson et al. | 702/186 |
| 6,480,938 B2 | 11/2002 | Vondran, Jr. | 711/125 |
| 6,505,292 B1 | 1/2003 | Witt | |
| 6,542,985 B1 | 4/2003 | Johnson et al. | |
| 6,594,820 B1 | 7/2003 | Ungar | |
| 6,601,233 B1 | 7/2003 | Underwood | |
| 6,631,514 B1 | 10/2003 | Le | |
| 6,775,825 B1 | 8/2004 | Grumann et al. | |
| 6,832,296 B2 | 12/2004 | Hooker | |
| 6,848,030 B2 | 1/2005 | Tokar et al. | |
| 6,918,106 B1 | 7/2005 | Burridge et al. | |
| 6,961,681 B1 | 11/2005 | Choquier et al. | |
| 6,961,925 B2 | 11/2005 | Callahan, II et al. | |
| 6,966,057 B2 | 11/2005 | Lueh | |
| 7,131,115 B2 | 10/2006 | Hundt et al. | |
| 7,181,723 B2 | 2/2007 | Luk et al. | |
| 2001/0032305 A1 | 10/2001 | Barry | 712/34 |
| 2002/0019976 A1 | 2/2002 | Patel et al. | 717/137 |
| 2002/0073406 A1 | 6/2002 | Gove | |
| 2002/0124237 A1 | 9/2002 | Sprunt et al. | 717/127 |
| 2002/0129309 A1 | 9/2002 | Floyd et al. | 714/724 |
| 2002/0147965 A1 | 10/2002 | Swaine et al. | 717/124 |
| 2002/0157086 A1 | 10/2002 | Lewis et al. | |
| 2002/0199179 A1 | 12/2002 | Lavery et al. | 717/158 |
| 2003/0014741 A1 | 1/2003 | Megiddo et al. | |
| 2003/0040955 A1 | 2/2003 | Anaya et al. | |
| 2003/0066055 A1 | 4/2003 | Spivey | |
| 2003/0131343 A1 | 7/2003 | French et al. | |
| 2003/0135719 A1 | 7/2003 | DeWitt, Jr. et al. | |
| 2003/0191900 A1 | 10/2003 | Hooker | |
| 2003/0225917 A1 | 12/2003 | Partamian et al. | |
| 2004/0049712 A1 | 3/2004 | Betker et al. | |
| 2004/0194076 A1 | 9/2004 | Comp et al. | |
| 2004/0268316 A1 | 12/2004 | Fisher et al. | |
| 2005/0210275 A1 * | 9/2005 | Homing et al. | 713/190 |
| 2007/0006150 A9 * | 1/2007 | Walmsley | 717/120 |

FOREIGN PATENT DOCUMENTS

| | | |
|---|---|---|
| JP | 2000347863 | 12/2000 |

OTHER PUBLICATIONS

Cohen et al., "Hardware-Assisted Characterization of NAS Benchmarks", Cluster Computing, vol. 4, No. 3, Jul. 2001, pp. 189-196.

Talla et al., "Evaluating Signal Processing and Multimedia Applications on SIMD, VLIW and Super Scalar Architectures", International Conference on Computer Design, Austin, Sep. 17-20, 2000, pp. 163-172.

Iwasawa et al., "Parallelization Method of Fortran DO Loops by Parallelizing Assist System", Transactions of Information Processings Society of Japan, vol. 36, No. 8, Aug. 1995, pp. 1995-2006.

Talla et al., "Execution Characteristics of Multimedia Applications on a Pentium II Processor", IEEE International Performance, Computing, and Communications Conference, 19th, Phoenix, Feb. 20-22, 2000, pp. 516-524.

IBM Research Disclosure Bulletin 444188, "Enable Debuggers as an Objective Performance Measurement Tool for Software Development Cost Reduction", Apr. 2001, pp. 686-688.

U.S. Appl. No. 09/435,069, Davidson et al., Method and Apparatus for Instruction Sampling for Performance Monitoring and Debug, filed Nov. 4, 1999.

U.S. Appl. No. 08/538,071, Gover et al., Method and System for Selecting and Distinguishing an Event Sequence using an Effective Address in a Processing System, filed Oct. 2, 1995.

DeWitt, Jr. et al., Method and Apparatus for Counting Instruction Execution and Data Accesses, Sep. 30, 2003.

Levine et al., Method and Apparatus for Selectively Counting Instructions and Data Accesses, Sep. 30, 2003.

DeWitt, Jr. et al., Method and Apparatus for Generating Interrupts Upon Execution of Marked Instructions and Upon Access to Marked Memory Locations, Sep. 30, 2003.

DeWitt, Jr. et al., Method and Apparatus for Counting Data Accesses and Instruction Executions that Exceed a Threshold, Sep. 30, 2003.

DeWitt, Jr. et al., Method and Apparatus for Counting Execution of Specific Instructions and Accesses to Specific Data Locations, Sep. 30, 2003.

DeWitt, Jr. et al., Method and Apparatus for Debug Support for Individual Instructions and Memory Locations, Sep. 30, 2003.

Levine et al., Method and Apparatus to Autonomically Select Instructions for Selective Counting, Sep. 30, 2003.

Levine et al., Method and Apparatus to Autonomically Count Instruction Execution for Applications, Sep. 30, 2003.

Levine et al., Method and Apparatus to Autonomically Take an Exception on Specified Instructions, Sep. 30, 2003.

Levine et al., Method and Apparatus to Autonomically Profile Applications, Sep. 30, 2003.

DeWitt, Jr. et al., Method and Apparatus for Counting Instruction and Memory Location Ranges, Sep. 30, 2003.

DeWitt, Jr. et al., Autonomic Method and Apparatus for Counting Branch Instructions to Improve Branch Predictions.

DeWitt, Jr. et al., Autonomic Method and Apparatus for Local Program Code Reorganization Using Branch Count Per Instruction Hardware.

Ramirez et al., "The Effect of Code Reordering on Branch Prediction", Proceedings of the International Conference on Parallel Architectures and Compilation Techniques, Oct. 2000, pp. 189-198.

Yang et al., "Improving Performance by Branch Reordering", Proceedings of the ACM SIGPLAN 1998 Conference onProgramming Language Design and Implementation, Montreal Canada, 1008, pp. 130-141.

Conte et al., "Accurate and Practical Profile-Driven Compilation Using the Profile Buffer", Proceedings of the 29th Annual ACM/IEEE International Symposium on Microarchitecture, Paris, France, 1996, pp. 36-45.

Conte et al., "Using Branch Handling Hardware to Support Profile-Driven Optimization", Proceedings of the 27th Annual International Symposium on Microarchitecture, San Jose CA, 1994, pp. 12-21.

Fisher, "Trace Scheduling: A Technique for Global Microcode Compaction", IEEE Transactions on Computers, vol. C30, No. 7, Jul. 1981, pp. 478-490.

Chang et al., "Using Profile Information to Assist Classic Code Optimizations", Software Pract. Exper. Dec. 21, 1991, pp. 1301-1321.

Schmidt et al., "Profile-Directed Restructuring of Operating System Code", IBM Systems Journal, 1998, vol. 37, No. 2, pp. 270-297.

Aho et al., "Compilers: Principles, Techniques, and Tools", Addison-Wesley, 1988, pp. 488-497.

Intel, "Intel IA-64 Architecture Software Developer's Manual", Revision 1.1, vol. 4, No. 245320.002, Jul. 2001.

* cited by examiner

AUTONOMIC METHOD AND APPARATUS FOR HARDWARE ASSIST FOR PATCHING CODE

CROSS REFERENCE TO RELATED APPLICATIONS

The present invention is related to the following applications entitled "Method and Apparatus for Counting Instruction Execution and Data Accesses", Ser. No. 10/675,777, filed on Sep. 30, 2003; "Method and Apparatus for Selectively Counting Instructions and Data Accesses", Ser. No. 10/674,604, filed on Sep. 30, 2003; "Method and Apparatus for Generating Interrupts Upon Execution of Marked Instructions and Upon Access to Marked Memory Locations", Ser. No. 10/675,831, filed on Sep. 30, 2003; "Method and Apparatus for Counting Data Accesses and Instruction Executions that Exceed a Threshold", Ser. No. 10/675,778, filed on Sep. 30, 2003; "Method and Apparatus for Counting Execution of Specific Instructions and Accesses to Specific Data Locations", Ser. No. 10/675,776, filed on Sep. 30, 2003; "Method and Apparatus for Debug Support for Individual Instructions and Memory Locations", Ser. No. 10/675,751, filed on Sep. 30, 2003; "Method and Apparatus to Autonomically Select Instructions for Selective Counting", Ser. No. 10/675,721, filed on Sep. 30, 2003; "Method and Apparatus to Autonomically Count Instruction Execution for Applications", Ser. No. 10/674,642, filed on Sep. 30, 2003; "Method and Apparatus to Autonomically Take an Exception on Specified Instructions", Ser. No. 10/674,606, filed on Sep. 30, 2003; "Method and Apparatus to Autonomically Profile Applications", Ser. No. 10/675,783, filed on Sep. 30, 2003; "Method and Apparatus for Counting Instruction and Memory Location Ranges", Ser. No. 10/675,872, filed on Sep. 30, 2003; "Method and Apparatus For Maintaining Performance Monitoring Structure in a Page Table For Use in Monitoring Performance of a Computer Program", Ser. No. 10/757,250 filed on Jan. 14, 2004; "Autonomic Method and Apparatus for Counting Branch Instructions to Improve Branch Predictions", Ser. No. 10/757,237, filed on Jan. 14, 2004; and "Autonomic Method and Apparatus for Local Program Code Reorganization Using Branch Count Per Instruction Hardware", Ser. No. 10/757,156, filed on Jan. 14, 2004. All of the above related applications are assigned to the same assignee, and incorporated herein by reference.

BACKGROUND OF THE INVENTION

1. Technical Field

The present invention relates generally to an improved data processing system and, in particular, to a method and system for improving performance of a program in a data processing system. Still more particularly, the present invention relates to a method, apparatus, and computer instructions for hardware assist for autonomically patching code.

2. Description of Related Art

In a conventional computer system, the processor fetches and executes program instructions stored in a high-speed memory known as cache memory. Instructions fetched from cache memory are normally executed without much delay. However, if the program instruction code requires access to data or instructions located in a memory location other than the high-speed cache memory, a decrease in system performance may result, particularly in a pipelined processor system where multiple instructions are executed at the same time.

Such accesses to data and/or instructions located in a memory location other than the high-speed cache memory may occur when the code of the computer program being executed is not organized to provide contiguous execution of the computer program as much as possible. That is, for example, when the computer program is not organized such that basic blocks of code are not organized in memory in the same sequence in which they are executed. One common approach to reduce the negative impact on system performance is to reorganize program code such that data or instructions accessed or executed by a computer program may be grouped together as close as possible.

Various approaches are known in the art to better organize program code. One approach is proposed by Heisch in "PROFILE-BASED OPTIMIZING POSTPROCESSORS FOR DATA REFERENCES" (U.S. Pat. No. 5,689,712). Heisch teaches optimization of programs by creating an instrumented program to capture effective address trace data for each of the memory references, and then analyzing the access patterns of the effective trace data in order to reorder the memory references to create an optimized program. The instrumented program generates an improved memory address allocation reorder list that indicates an optimal ordering for the data items in the program based upon how they are referenced during program execution.

Another approach to optimize program code is suggested by Pettis et al. in "METHOD FOR OPTIMIZING COMPUTER CODE TO PROVIDE MORE EFFICIENT EXECUTION ON COMPUTERS HAVING CACHE MEMORIES" (U.S. Pat. No. 5,212,794). Pettis teaches running program code with test data to produce statistics in order to determine a new ordering for the code blocks. The new order places code blocks that are often executed after one another close to one another in the memory. However, the above approaches require modification of the original code. That is, the above approaches require that the code itself be modified by overwriting the code.

Moreover, when a portion of code is determined to be in need of patching, the code is typically modified so that that original code is shifted downward in the instruction stream with the reorganized code being inserted above it in the instruction stream. Thus, the original code is again modified from its original form.

Code patching may apply to various types of performance optimization functions. For example, the program may determine to reorganize code at run time. In addition, when a computer system is running slow, code patching may be used to switch program execution to an instrumented interrupt service routine that determines how much time the system is spending in interrupts. Furthermore, when a performance monitoring program wants to build a targeted instruction trace for specific instructions, code patching may also be used to hook each instruction block to produce a trace.

It would be advantageous to have an improved method, apparatus, and computer instructions for autonomically patching code by selectively identifying branch instructions or other types of instructions to optimize performance, and providing a pointer indicating where to branch without modifying the original program code.

SUMMARY OF THE INVENTION

The present invention provides an improved method, apparatus, and computer instructions for providing and making use of hardware assistance to autonomically patch code. The terms "patch" or "patching" as they are used in the present application refer to a process by which the execution of the code is modified without the original code itself being modified, as opposed to the prior art "patching" which involves modification of the original code. This process may involve branching the execution to a set of instructions that are not present in the original code in the same form. This set of instructions may be, for example, a reorganized copy of a set of instructions within the original code, an alternative set of instructions that are not based on the original code, or the like.

In the context of the present invention, the hardware assistance used by the present invention may include providing hardware microcode that supports a new type of metadata, so that patch code may be executed easily at run time for a specific performance optimization function, such as, for example, obtaining more contiguous execution of the code by reorganizing the series of instructions in the original code. The metadata takes the form of a memory word, which is stored in the performance instrumented segment of the application.

For example, the code may be overridden at run time to change the order in which instructions are executed by patching the code. The patching of the code in the present invention performs patching of code by constructing a new order of program execution or providing alternative instrumented code in an allocated memory location. The present invention also provides a metadata that identifies the allocated memory location from which the patch instructions are executed. Thus, the original code of the computer program is not modified, only the execution of the computer program is modified.

In addition, the present invention provides a new flag to the machine status register (MSR) in the processor for enabling or disabling the functionality of patching code using metadata. When the functionality is enabled, a performance monitoring application may patch code at run time for a specific performance optimization function. One example of patching code is to reorganize portions of code in accordance with the present invention. If a performance monitoring application determines that a block of code should be reorganized, the performance monitoring application may copy the portion of code that needs to be reorganized to a dedicated memory region and then reorganize it in a manner designated by the performance monitoring application. The performance monitoring application may then generate and associate metadata with the original portion of code.

As the program instructions are executed, the processor reads the metadata generated during the program execution. The program loads the metadata into the allocated workspace, such as a performance shadow cache, and associates the metadata with the instructions.

In one embodiment, the metadata may be associated with a branch instruction. The metadata includes a 'branch to' pointer pointing to the starting address of the patch instructions in an allocated memory location. The starting address may be an absolute or offset address. During program execution, if the branch is not taken, the metadata is ignored. If the branch is taken, this 'branch to' pointer is read by the processor which then executes an unconditional branch to the starting address indicated by the 'branch to' pointer of the metadata.

At the end of the patch instructions, an instruction may redirect the execution of the computer program back to the original code at an appropriate place in the code where the branch would have continued to had the original code been executed during the execution of the branch. This place in the code may also be some other place in the code. For example, if a number of original instructions are duplicated to perform certain functionality when constructing patch instructions, the appropriate place in the code to return to is the instruction where the functionality is complete.

In an alternative embodiment, the metadata may be associated with both branch and non-branch instructions. The metadata includes a pointer pointing to the starting address of the patch instructions in the allocated memory location. The starting address may be an absolute or offset address. During execution of the computer program, the original program instruction associated with the metadata is ignored. Instead, the processor branches unconditionally to the starting address identified by the pointer of the metadata.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary diagram illustrating an example of metadata in accordance with a preferred embodiment of the present invention;

DETAILED DESCRIPTION OF THE PREFERRED EMBODIMENTS

Figure 1:
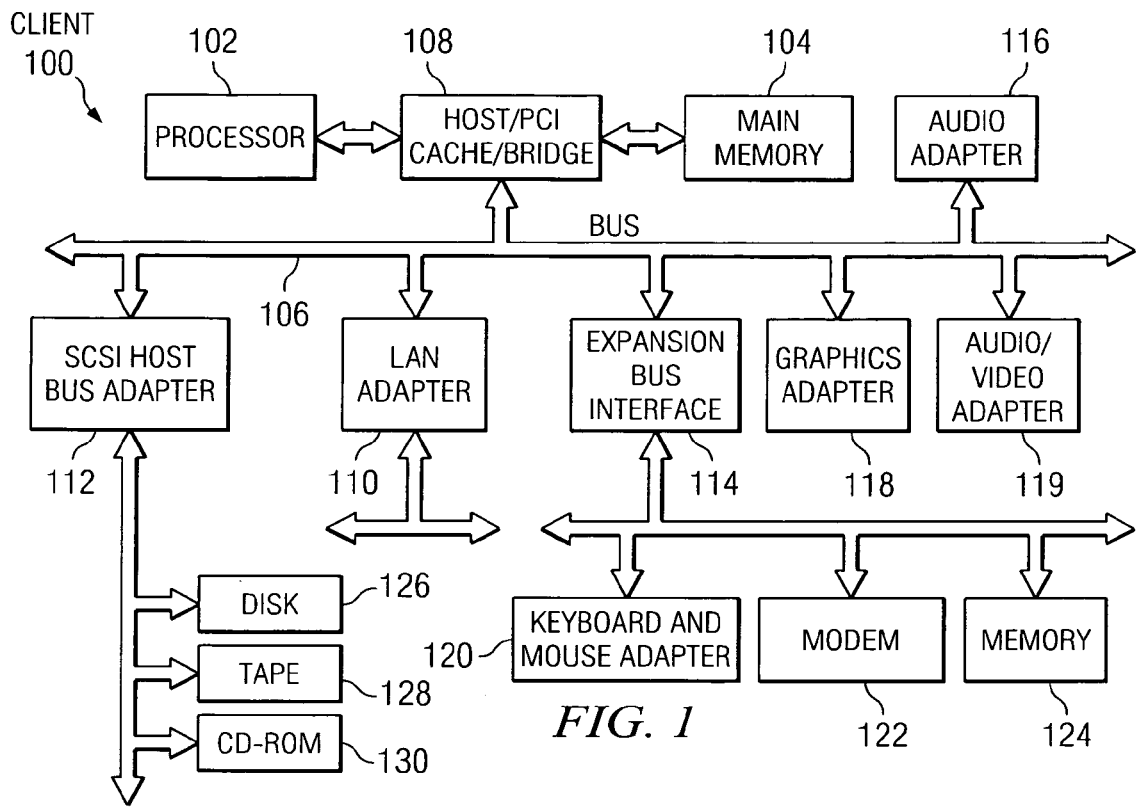
FIG. 1 is an exemplary block diagram of a data processing system in which the present invention may be implemented.

The present invention provides a method, apparatus and computer instructions to autonomically patch code using hardware assistance without modifying the original code. The terms "patch", "patching", or other forms of the word "patch", as they are used in the present application refer to a process by which the execution of the code is modified without the original code itself being modified, as opposed to the prior art "patching" which involves modification of the original code.

As described in the related U.S. patent applications listed and incorporated above, the association of metadata with program code may be implemented in three ways: by directly associating the metadata with the program instructions to which it applies; by associating metadata with program instructions using a performance shadow cache, wherein the performance shadow cache is a separated area of storage, which may be any storage device, such as for example, a system memory, a flash memory, a cache, or a disk; and by associating metadata with page table entries. While any of these three ways may be utilized with the present invention, the latter two ways of association are used in the present description of the preferred embodiments of the present invention for illustrative purposes.

The present invention uses a new type of metadata, associated with program code in one of the three ways as described above, to selectively identify instructions of a program. The metadata takes the form of a new memory word. This new memory word is stored in a performance instrumentation segment of the program, which is linked to the text segment of the program code. The performance instrumentation segment is described in the above applications incorporated by reference.

The present invention also uses a new flag in the machine status register (MSR) to enable or disable a performance monitoring application's or process's availability for patching code using metadata. The MSR is described in applications incorporated by reference above. Many existing processors include a MSR, which contains a set of flags that describe the context of the processor during execution. The new flag of the present invention is added to this set of flags to describe the functionality desired for each process.

For example, the new flag may be used to describe three states: a value of '00' indicates disabling the process's or application's functionality for patching code; a value of '01' indicates enabling the process's or performance monitoring application's functionality for patching code by using metadata to jump to patch code indicated by the 'branch to' pointer if a branch is taken; and a value of '10' indicates enabling the process's or performance monitoring application's functionality for patching code by using metadata to jump to the patch code unconditionally, which allows the performance monitoring application or process to execute the patch code and ignore the original program instructions.

When the functionality of patching code using metadata is enabled, the performance monitoring application determines at run time that the code should be patched, the performance monitoring application may allocate an alternative memory location and generate a patched version of the original code for use in subsequent executions of the computer program. This code may be a copy of the original portion of code or an instrumented portion of code, such as an interrupt service routine that tracks the amount of time spent on interrupts or the like. The patched code may then be linked to the original portion of code by metadata generated by the performance monitoring application and stored in association with the original code.

The metadata includes a 'branch to' pointer pointing to the patched code. In one embodiment, when the processor encounters a branch instruction that has metadata associated with it, execution is redirected to a patched portion of code if the branch is taken. The metadata is then read in by the processor, which then loads and executes the instructions of the patched portion of code starting at the address identified by the 'branch to' pointer in the metadata. Once the patched code has been executed, the processor returns to the original code indicated by end of the patch instructions. If the branch is not taken, the metadata is ignored by the processor. In an alternative embodiment, the 'branch to' execution could start at the 'branch to' address identified in the metadata only when the branch is not taken.

In an alternative embodiment, instead of checking if the branch is taken, the branch instruction or any other type of instruction with metadata associated is ignored. Execution is redirected to a patched code unconditionally. The metadata is read in by the processor, which then loads and executes the instructions of the patched code starting at the address identified by the 'branch to' pointer of the metadata. In this way, the metadata generated by the performance monitoring application permits patching of the original code by overriding the execution of the original code, without modifying the original program code.

Figure 2:
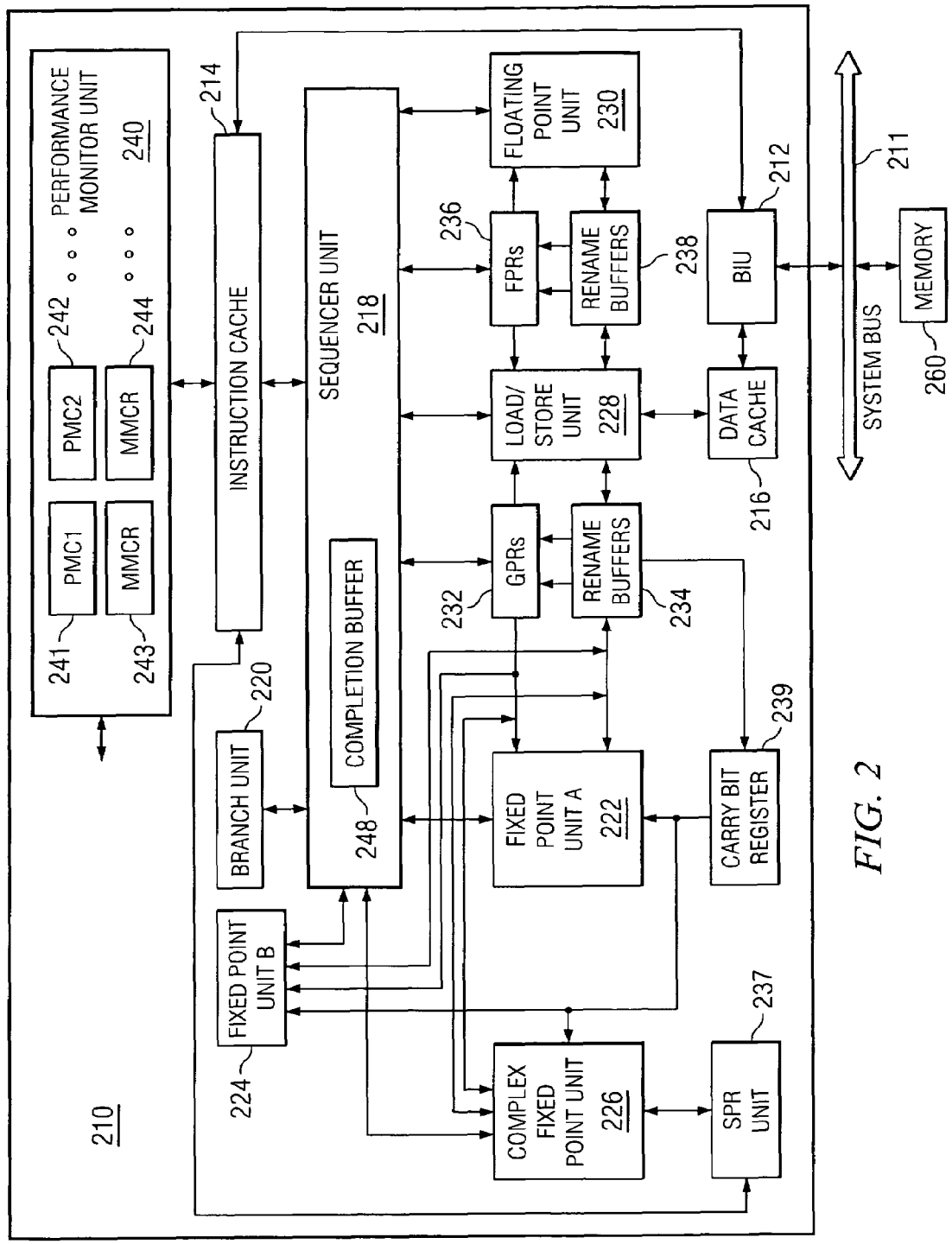
FIG. 2 is an exemplary block diagram of a processor system for processing information in accordance with a preferred embodiment of the present invention.

The present invention may be implemented in a computer system. The computer system may be a client or a server in a client-server environment that is interconnected over a network. Therefore, the following FIGS. 1-3 are provided in order to give an environmental context in which the operations of the present invention may be implemented. FIGS. 1-3 are only exemplary and no limitation on the computing environment or computing devices in which the present invention may be implemented is intended or implied by the depictions in FIGS. 1-3.

With reference now to FIG. 1, an exemplary block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 connect to PCI local bus 106 through PCI bridge 108. PCI bridge 108 also may include an integrated memory controller and cache memory for processor 102. Additional connections to PCI local bus 106 may be made through direct component interconnection or through add-in boards.

In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and coordinates and provides control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Turning next to FIG. 2, an exemplary block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 connects to a bus interface unit ("BIU") 212 of processor 210. BIU 212 controls the transfer of information between processor 210 and system bus 211.

BIU 212 connects to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 239 connected to system bus 211. Moreover, data cache 216 is able to output (through BIU 212 and system bus 211) information from data cache 216 to system memory 239 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 239 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or carry bit(CA) register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218. In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR (move from SPR) and MTSPR (move to SPR) instructions executable by CFXU 226. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation. Counters 241-242 may also be used to collect branch statistics per instruction when a program is executed.

As mentioned above, the present invention provides an improved method, apparatus, and computer instructions for providing and using hardware assistance in autonomically patching code. The present invention makes use of hardware microcode that supports a new type of metadata to selectively identify portions of code that require patching, or for which patching is desired, in order to provide more efficient execution, or even alternative execution, of the computer program or to perform specific performance optimization functions. The metadata takes the form of a new memory word, which is stored in a performance instrumentation segment of the program. The performance monitoring application links the performance instrumentation segment to the text segment of the program code by adding a reference in the text segment. This performance instrumentation segment includes a table listing program metadata.

Patching code may include reorganizing the identified portions of code or replacing identified portions of code with alternative instrumented code. Metadata may then be associated with the original portion of code that directs the processor to the reorganized or alternative instrumented portion of code.

During execution of instructions, a performance monitoring application identifies a portion of code that is in need of optimization. An example of optimization includes reorganizing instructions to increase efficiency, switching execution to instrumented interrupt service routines to determine time spent in interrupts, providing hooks to instructions to build an instruction trace, or the like. Alternatively, the performance monitoring application may identify a portion of code for which it is desirable to modify the execution of the portion of code, whether that be for optimization purposes or to obtain a different execution result. For example, the execution of the original code may be modified such that a new functionality is added to the execution of the code that was not present in the original code. This new functionality may be added without modifying the original code itself, but only modifying the execution of the original code. For purposes of the following description, however, it will be assumed that the present invention is being used to optimize the execution of the original code through non-invasive patching of the execution of the original code to execute a reorganized portion of code according to the present invention. However, it should be appreciated that the present invention is not limited to such applications of the present invention and many other uses of the present invention may be made without departing from the spirit and scope of the present invention.

For example, the performance monitoring application may reorganize code autonomically by analyzing the access patterns of branch instructions. The performance monitoring application reorganizes the sequence of instructions such that the instructions within the branch of the portion of code appear prior to the non-branch instructions in the sequence of instructions. In this way, the instructions within the branch, which are more likely to be executed during execution of the computer program, are executed in a more contiguous manner than in the original code.

Similarly, if the performance monitoring application determines that at a branch instruction, the branch is seldom taken, the performance monitoring application may perform the reorganization itself, such that the non-branch instructions appear in the sequence of instructions prior to the instructions in the branch. In either case, metadata pointing to this dedicated memory area storing the reorganized code is generated at run time by the performance monitoring application and associated with the original code so that the reorganized code may be executed instead.

In a preferred embodiment, if a branch instruction is associated with metadata and the branch is taken as a result of executing the branch instruction, the processor reads the metadata, which includes a 'branch to' pointer that points to the starting address of the reorganized code to which the processor branches the execution. Thus, the address in the original branch instruction is ignored. Alternatively, if the branch is not taken as a result of executing the branch instruction, the metadata is ignored by the processor.

In an alternative embodiment, when the branch instruction, or any other type of instruction, is executed, if the instruction is associated with metadata, the processor reads the metadata and ignores the address in the original instruction. That is, the processor reads the metadata, which includes a pointer pointing to the starting address of the reorganized code, and executes the reorganized code.

When execution of the reorganized portion of code in the allocated memory location is complete, the execution of the computer program may be redirected back to some place in the original code. This place in the original code may be the instruction after the ignored original instruction or the instruction after the original instructions that were duplicated.

Turning now to FIG. 3, an exemplary diagram illustrating an example of metadata is depicted in accordance with a preferred embodiment of the present invention. In this example implementation, metadata 312 is in the form of a new memory word, which is stored in the performance instrumentation segment of the program. Metadata 300 includes three entries, entry 302, 304 and 306. Each of these entries includes an offset and data for describing the 'branch to' pointer pointing to the patch code.

In this example, entry 1 offset 310 is the displacement from the beginning of the text segment to the instruction to which the metadata word applies. This offset location identifies which instruction of the program with which the metadata is associated. Entry 1 data 312 is the metadata word that indicates the 'branch to' pointer that points to the starting address of the patch code.

The processor may utilize this metadata in any of the three ways described earlier, for example, via a 'shadow cache'. The processor detects the performance instrumentation segment linked to the text segment at the time that instructions are loaded into the instruction cache. At instruction load time, the processor also loads the corresponding performance metadata into its shadow cache. Then, as an instruction is executed out of the instruction cache, the processor may detect the existence of a metadata word in the shadow cache, mapped to the instruction it is executing. The format of the data in the shadow cache is very similar to the format of the data in FIG. 3 with a series of entries correlating the metadata word 312 with the instruction in the instruction cache. The preferred means of associating the metadata with the instruction using a performance instrumentation shadow cache are described in related U.S. patent application "Method and Apparatus for Counting Execution of Specific Instructions and Accesses to Specific Data Locations", Ser. No. 10/675,776, filed on Sep. 30, 2003, which is incorporated above.

In one embodiment, if a branch is taken as a result of executing a branch instruction, the processor executes the patch code block at starting address 0x80001024, indicated by the 'branch to' pointer in entry 1 data 312 in the shadow cache. If the branch is not taken, entry 1 data 312 is ignored by the processor. Once the execution of patch code is complete, the processor returns to the original instructions as directed at the end of the patch code block.

In an alternative embodiment, entry 1 data 312 may be associated with an instruction other than a branch instruction. The processor examines entry 1 data 312 in entry 1 302 and executes the patch code block at the starting address indicated by the entry 1 data 312 unconditionally. Thus, the original instruction, at offset address 0x120 as described by entry 1 offset 310, is ignored by the processor.

Figure 4A:
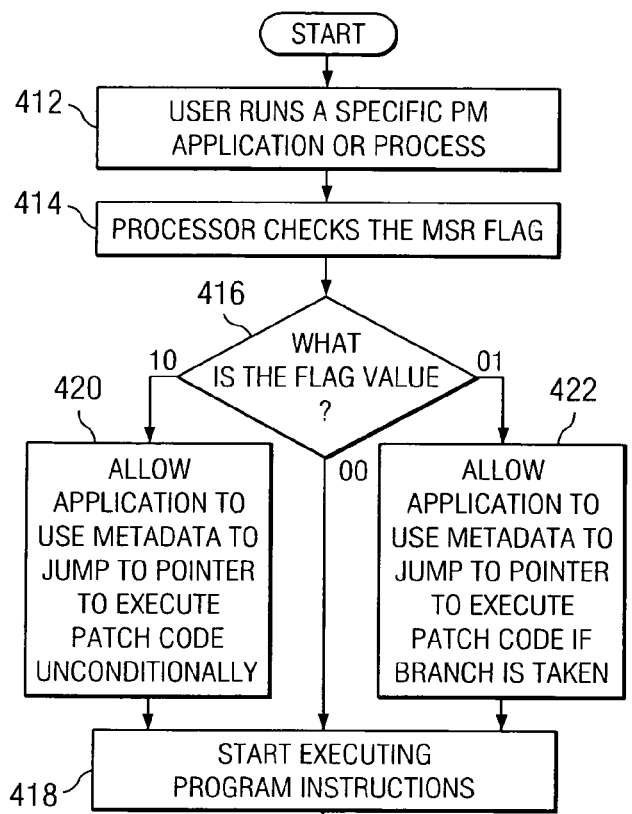
FIG. 4A is a flowchart outlining an exemplary process for enabling or disabling the functionality of a performance monitoring application or process for patching code using metadata in a preferred embodiment in accordance of the present invention.

Turning next to FIG. 4A, a flowchart outlining an exemplary process for enabling or disabling the functionality of a performance monitoring application or process for patching code using metadata is depicted in a preferred embodiment in accordance with a preferred embodiment of the present invention. The process begins when the user runs a specific performance monitoring application or process (step 412). The processor, such as processor 200 in FIG. 2, checks the new flag in the machine status register (MSR) (step 414). A determination is then made by the processor as to what the value of the new flag is (step 416). If the value is '00', the performance monitoring application or process is disabled from performing code patching functions, therefore the processor starts executing the program instruction immediately (step 418) and the process terminating thereafter.

Turning back to step 416, if the flag value is '01', the performance monitoring application or process is enabled to perform the code patching function by using metadata to jump to the 'branch to' pointer only if a branch is taken, in order to execute the patch code (step 422). A branch is taken as a result of executing a branch instruction. If the branch is not taken, the metadata is ignored. Next, the processor starts executing the program instruction immediately (step 418) and the process terminating thereafter.

Turning back to step 416, if the flag value is '10', the performance monitoring application or process is enabled to perform code patching function unconditionally. Thus, the performance monitoring application or process uses 'branch to' pointer in the metadata to jump to the starting address of the patch code unconditionally (step 420). Thus, the processor ignores the original instruction of the program when the metadata is encountered. Once the performance monitoring application or process is enabled to use metadata to perform code patching function, the processor starts executing the program instruction (step 418), the process terminating thereafter.

Figure 4B:
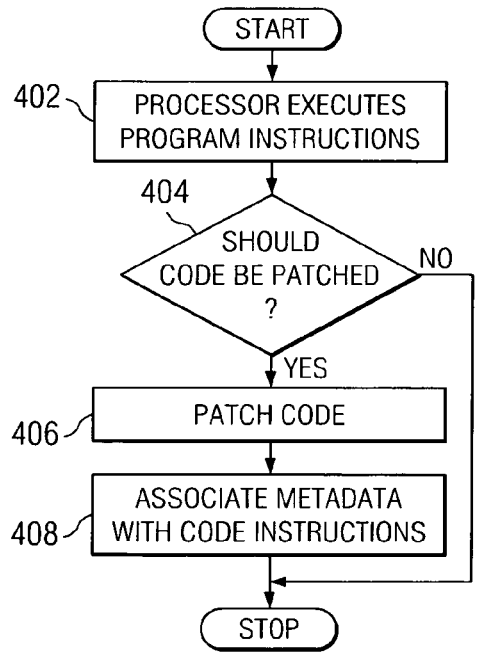
FIG. 4B is a flowchart outlining an exemplary process for providing and using hardware assistance in patching code in accordance with a preferred embodiment of the present invention.

Turning next to FIG. 4B, a flowchart outlining an exemplary process for providing and using hardware assistance in patching code is depicted in accordance with a preferred embodiment of the present invention. The process begins when the processor executes program instructions (step 402) after the process steps of FIG. 4A are complete. If the code patching functionality is enabled using process steps in FIG. 4A, a determination is made by the performance monitoring application at run time as to whether one or more portions of code should be patched for specific performance optimization function (step 404). For example, the performance monitoring application determines whether to reorganize code by examining the access patterns of the branch instructions. If the code does not need to be patched, the operation terminates.

If the performance monitoring application determines that the code should be patched in step 404, the performance monitoring application patches the code (step 406) and associates metadata with the original code instructions (step 408), with the process terminating thereafter.

Figure 5:
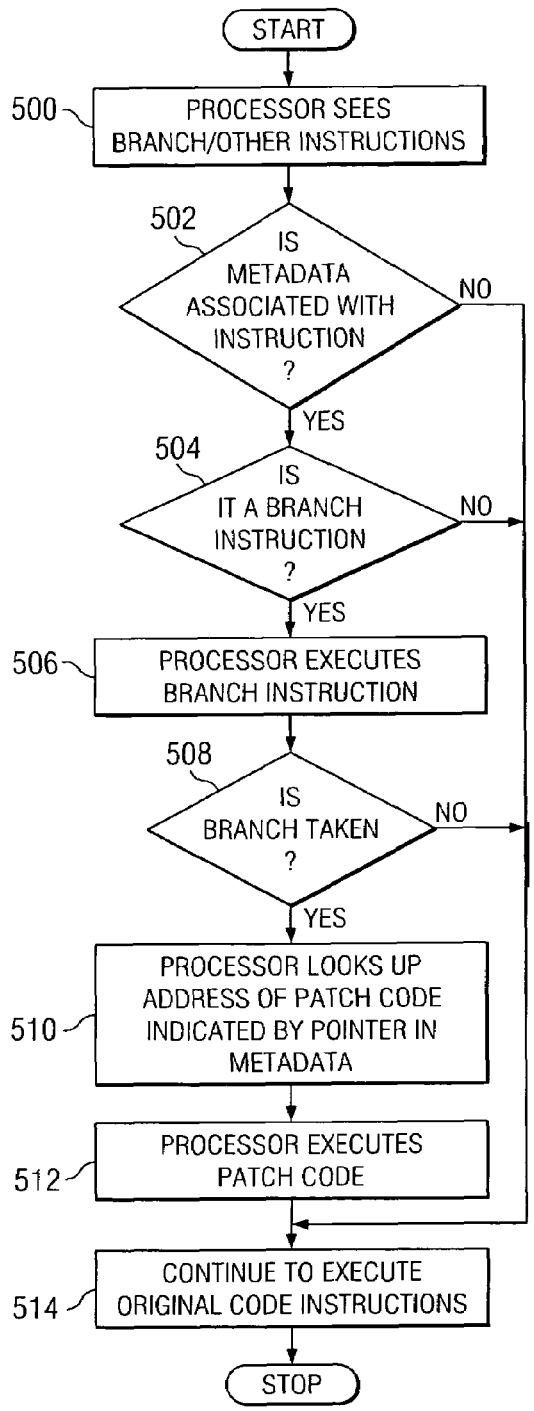
FIG. 5 is a flowchart outlining an exemplary process of handling metadata associated with instructions from the processor's perspective when code patching functionality is enabled with a value of '01' in accordance with a preferred embodiment of the present invention.

Turning next to FIG. 5, a flowchart outlining an exemplary process of handling metadata associated with instructions from the processor's perspective when code patching functionality is enabled with a value of '01' is depicted in accordance with a preferred embodiment of the present invention. The process begins when the processor sees a branch instruction or other types of instruction during program execution (step 500). This step is performed after the process steps of FIG. 4A are complete. The processor determines if metadata is associated with the instruction (step 502). If no metadata is associated with the instruction, the processor continues to execute code instructions (step 514), the process terminating thereafter.

Turning back to step 502, if metadata is associated with the instruction, a determination is made by the processor as to whether the instruction is a branch instruction (step 504). In a preferred embodiment, if the instruction is a branch instruction, the processor executes the branch instruction (step 506).

After the branch instruction is executed, a determination is made as to whether the branch is taken (step 508). If the branch is taken as a result of executing the branch instruction, the processor looks up the address of the patch code indicated by the 'branch to' pointer of the metadata (step 510). If the branch is not taken as a result of executing the branch instruction, the metadata is ignored and the processor continues to execute original code instructions (step 514), the process terminating thereafter.

Turning back to step 504, if the instruction is not a branch instruction, the process continues to execute original code instructions (step 514), the process terminating thereafter.

Continuing from step 510, the processor executes the patch code (step 512) at the starting address obtained from step 510 and returns to execute the original code instructions (step 514) indicated by the end of the patch code, the process terminating thereafter.

Figure 6:
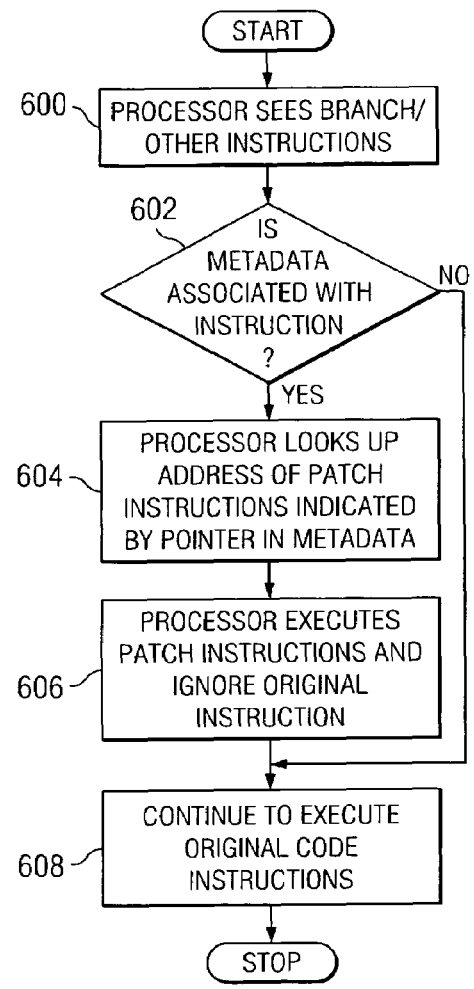
FIG. 6 is a flowchart outlining an exemplary process of handling metadata associated with instructions from the processor's perspective when code patching functionality is enabled with a value of '10' in accordance with a preferred embodiment of the present invention.

Turning next to FIG. 6, an exemplary diagram illustrating an example of handling metadata associated with instructions from the processor's perspective when code patching functionality is enabled with a value of '10' is depicted in accordance with the present invention. The process begins when the processor sees a branch instruction or other types of instruction during program execution (step 600). This step is performed after the process steps of FIG. 4A are complete.

The processor then determines if metadata is associated with the instruction (step 602). If no metadata is associated with the instruction, the process continues to execute original code instructions (step 608), the process terminating thereafter. If metadata is associated with the instruction, the processor looks up the address of the patch code indicated by the 'branch to' pointer of the metadata (step 604). The processor executes the patch instructions unconditionally and ignores the original program instruction (step 606). The processor continues to execute original program instructions (step 608) and the process terminating thereafter.

Thus, the present invention allows a user to enable or disable the functionality of code patching performed by a performance monitoring application or process. The present invention provides a new flag in the machine status register (MSR) for enabling or disabling the funcationality. When the functionality is enabled, the present invention allows the performance monitoring application or process to use metadata to selectively identify portions of code to patch. This allows an alternative or optimized execution of computer program code.

The metadata takes the form of a memory word, which is stored in the performance instrumentation segment of the application. The present invention does not require that the original code itself be modified and instead, makes use of the metadata, to autonomically determine what instructions are executed at run time. In this way, the original code is not modified, only the execution of the code is modified.

The metadata includes a 'branch to' pointer pointing to the starting address of the patch code that is to be executed. Thus, using the innovative features of the present invention, the program may patch code autonomically by selectively identifying the branch instruction or other types of instruction and associating metadata comprising pointers to the patch code.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of autonomically patching computer program code, comprising:
- checking a flag in a machine status register to determine whether code patching functionality is to be enabled;
- responsive to determining that code patching functionality is to be enabled, enabling the code patching functionality;
- executing a computer program instruction, wherein the computer program instruction is located at a start of a block of code of an execution sequence of original code instructions;
- determining whether metadata is associated with the computer program instruction, wherein the metadata identifies the computer program instruction as a computer program instruction having associated patch instructions, and indicates an address of the patch instructions;
- responsive to determining that metadata is associated with the computer program instruction, redirecting execution to the patch instructions at the address indicated by the metadata;
- executing the patch instructions;
- returning to an instruction of the execution sequence of original code instructions in the computer program; and
- storing a result of executing the execution sequence.

2. The method of claim 1, wherein the patch instructions are created during execution of the computer program.

3. The method of claim 1, wherein the patch instructions are created by:
- copying instructions from the block of code to a new memory location;
- modifying the order of the instructions of the block of code; and
- populating the metadata with a pointer to the patch instructions.

4. The method of claim 1, wherein the metadata is in a form of a memory word.

5. The method of claim 1, wherein the metadata includes a pointer to the patch instructions for indicating the address of the patch instructions.

6. The method of claim 5, wherein the pointer to the patch instructions includes a starting address of the patch instructions in an allocated memory location.

7. The method of claim 6, wherein the starting address includes at least one of an absolute or offset address.

8. The method of claim 1, wherein the patch instructions includes at least one of reorganized instructions, instrumented alternative instructions, and hooks to build an instruction trace.

* * * * *